United States Patent [19]

Milan et al.

[11] Patent Number: 4,468,087

[45] Date of Patent: Aug. 28, 1984

[54] DEVICE FOR COUPLING TWO OPTICAL FIBERS

[75] Inventors: Lucien R. Milan, Garches; Roland R. Gousseau, Brunoy, both of France

[73] Assignee: U.S. Philips Corporation, New York, N.Y.

[21] Appl. No.: 488,561

[22] Filed: Apr. 25, 1983

Related U.S. Application Data

[63] Continuation of Ser. No. 205,068, Nov. 10, 1980, abandoned.

[30] Foreign Application Priority Data

Nov. 2, 1979 [FR] France .................. 79 27153

[51] Int. Cl.³ .............................................. G02B 7/26
[52] U.S. Cl. ................................ 350/96.18; 350/96.21
[58] Field of Search ............. 350/96.18, 96.20, 96.21, 350/96.22

[56] References Cited

U.S. PATENT DOCUMENTS

| 4,087,155 | 5/1978 | Deacon | 350/96.21 |
|---|---|---|---|
| 4,099,832 | 7/1978 | Warner, Jr. | 350/96.21 |
| 4,109,994 | 8/1978 | Chown | 350/96.21 |
| 4,181,402 | 1/1980 | Borsuk et al. | 350/96.21 |
| 4,265,511 | 5/1981 | Nicia et al. | 350/96.18 |
| 4,289,374 | 9/1981 | Franken et al. | 350/96.2 |
| 4,378,145 | 3/1983 | Stancati et al. | 350/96.21 |

FOREIGN PATENT DOCUMENTS 1467796  3/1977 United Kingdom .

OTHER PUBLICATIONS

Hensel, "Triple-Ball Connector for Optical Fibres", *Electronics Lett.*, vol. 13, No. 24, Nov. 1977, pp. 734-735.

Millar et al., "Monomode Fibre Connector Using Fibre Bead Location", *6th Eur. Conf. on Opt. Commun.*, York, U.K., Sep. 1980, pp. 306-309.

*Primary Examiner*—John D. Lee
*Attorney, Agent, or Firm*—Marc D. Schechter

[57] ABSTRACT

The coupling device according to the invention comprises two coupling members, each of which has a circularly cylindrical recess on one side. An end of a fiber to be coupled is centered in each recess by means of two sets of balls which are arranged one on top of the other. The first set of balls bears against the fiber end. The second set of balls bears on the first set and against the wall of the recess and presses the first set of balls against the fiber end. A spherical lens is arranged on the second set of balls so that the optical axis of the lens coincides with the axis of the centered fiber.

10 Claims, 5 Drawing Figures

DEVICE FOR COUPLING TWO OPTICAL FIBERS

This is a continuation, of application Ser. No. 205,068, filed Nov. 10, 1980 now abandoned.

BACKGROUND OF THE INVENTION

The invention relates to a deive for coupling pairs of optical fibers. Such a device includes two coupling members which are provided with fixing means for detachably connecting the coupling members to each other. Each coupling member is provided on one side with at least one circularly cylindrical recess. A bore extends from each recess as far as the other side of each coupling member for introducing, from the other side, an end of an optical fiber into the recess. A set of identical spherical balls, for centering the end of the optical fiber introduced into the recess, is provided in each recess.

Devices of this kind are used for coupling optical fibers in communication systems, where optical fibers are used for the transmission of light pulses carrying information. For the use and maintenance of the circuits used in such systems, mounting and removal of the devices should be easy. Considering the large numbers in which they are employed, the cost price of these devices should also remain within reasonable limits. Moreover, the devices have to be constructed so that each optical coupling between two optical fibers involves a minimal loss of energy.

A low-loss coupling requires the correct alignment of the axes of the fibers in the vicinity of the ends thereof where the coupling is realized, and also the correct positioning of the ends with respect to each other. The device described in the article "Triple-Ball Connector For Optical Fibres" by P. Hensel (published in "Electronics Letters," Vol. 13, No. 34, Nov. 24, 1977) represents an attractive solution for obtaining substantially the desired alignment and correct positioning. In the vicinity of the coupling location in the device, each fiber is fed through a calibrated opening of a cylinder whose diameter substantially equals the fiber diameter. The end of the fiber then enters a space which is enclosed by three mutually contacting identical balls, the centers of which form the apices of an equilateral triangle whose plane extends perpendicular to the axis of the enclosed fiber. When the diameter of the balls is suitably chosen, the space is dimensioned so that the diameter of the inscribed circle substantially equals the diameter of the fiber to be coupled.

In this device, the two fibers are coupled by bringing both sets of balls (each set being associated with one of the two fibers) into contact with each other so that each ball of each set is situated between two balls of the other set. The centers of the inscribed circles between the balls then coincide with the axes of the fibers. The foregoing can be realized only if the balls are arranged in a bush having a very accurately dimensioned inner diameter.

SUMMARY OF THE INVENTION

It is an object of the invention to make a device for coupling pairs of optical fibers so that the mounting is simple, so that no precision components are required, and so that the cost of the coupling device remains within reasonable limits.

To this end, in a device according to the invention, on the first set of balls arranged in the recess there is arranged a second set of mutually identical balls. The diameter of the recess is larger than the circumscribed circle of the first set of balls, each ball of the second set bearing on two balls of the first set and against the wall of the recess and pressing the balls of the first set against each other. Each coupling member is provided on the side of the recess with a reference face which is directed transverse to the axis of rotation of the recess.

The device according to the invention offers the advantage that the diameter of the recess need not be exactly adapted to the diameter of the first set of balls (and hence to the diameter of the fiber to be coupled).

The invention not only enables one to center a fiber having a given diameter, but also fibers of different diameters. Preferably, use is then made of a set of balls having a diameter such that the inscribed circle at the contacting balls (of the first set) is substantially equal to the diameter of the fiber to be centered. Obviously, the device according to the invention also enables one to center fibers, which have been provided with an envelope of which an outer jacket is concentric with the optical core and is formed in known manner, for example as described in U.S. Pat. No. 4,289,374, which corresponds to Netherlands patent application 78.09.725.

A further cause of energy loss in couplings between optical fibers is the divergence of the light beam at the fibers ends. Due to divergence, light rays emerging from a fiber cannot all be intercepted by the adjoining fiber, even if the fiber ends are arranged one substantially against the other as described in the article discussed above. To this end, the end of the optical fiber should be placed in the correct position between the balls under a microscope (the permissible tolerances amount to only a few micrometers).

In order to eliminate this drawback, a spherical lens is arranged in front of each fiber end according to known techniques (for example, see British patent specification No. 1,467,796). The diameter of the lens is much larger than the fiber diameter, and its center is situated on the axis of the fiber while its focus is situated on the end face of the fiber. The light beam emerging from the end face of a fiber is thus completely focused onto the end face of the adjacent fiber. Obviously, it is important to ensure that the axes of the fibers are carefully aligned and that the centers of the lenses are situated on these axes.

It is a further object of the invention to provide a coupling device which, in order to minimize energy loss, combines the advantages obtained by the exact alignment and the exact positioning of the fibers with the focusing of the beams onto the end faces of the fibers.

To this end, in a preferred embodiment of the device according to the invention, on the second set of balls there is arranged a spherical lens which is retained there by a clamping means.

The device according to the invention utilizes the known ball centering for the alignment and the positioning of the fibers; however, the second set of balls is used to compensate for the difference between the internal diameter of the recess and the diameter of the circle circumscribed around the first set of balls. The second set of balls is also used for centering the spherical lens with respect to the longitudinal axis of the optical fiber. In addition to the technical advantages of this device from a point of view of energy loss, it also offers the advantage that no high-precision components are required and that the balls of, for example, tungsten carbide, are commercially available and are not expensive.

Therefore, mass production of the coupling device is possible at a cost which remains within reasonable limits.

In a further embodiment of a device according to the invention, the first set of balls bears on a spacer bushing which in its turn bears on a centering means. The centering means arranged at the bottom of the recess and it serves to center the central axis of the fiber onto the axis of rotational symmetry of the recess. In an embodiment of this kind, the fiber end is thus centered at two points, i.e. by the first set of balls and by the centering means, so that the central axis of the fiber is centered onto the axis of rotation of the recess. As a result, the central axes of two fibers to be coupled are aligned one with respect to each other, so that energy losses are limited.

DESCRIPTION OF THE PREFERRED EMBODIMENTS

Figure 1:
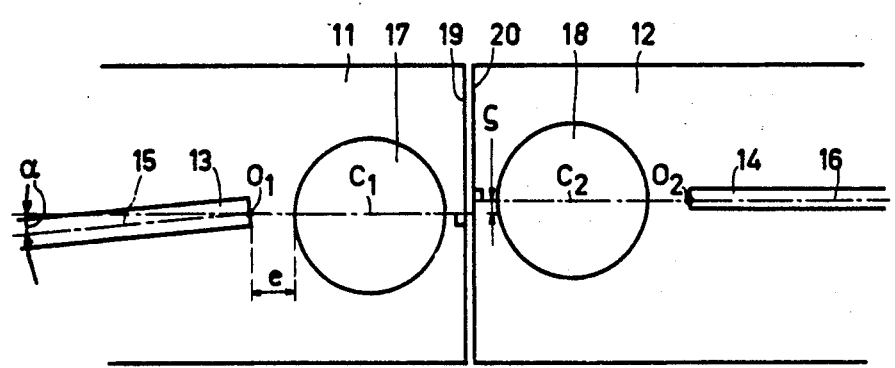
FIG. 1 schematically illustrates the technical problems to be solved for coupling optical fibers.

The reference numerals 11 and 12 in FIG. 1 schematically denote two coupling members, shown in a sectional view, of the coupling device to be realized. The two fibers to be coupled are denoted by the reference numerals 13 and 14 and their axes are denoted by the reference numerals 15 and 16; the centers of the front faces of the fibers are denoted by $O_1$ and $O_2$, respectively. The coupling device further comprises two optical spherical lenses 17 and 18 having centers $C_1$ and $C_2$, respectively; the foci of the lenses should be situated at $O_1$ and $O_2$, respectively.

The coupling of the fibers is realized by bringing the members 11 and 12 into contact with each other by way of their relevant flat surfaces 19 and 20, which are referred to as reference faces. FIG. 1 illustrates the various mechanical conditions (requirements) to be satisfied for the positioning and alignment of the fibers and lenses in order to minimize the coupling losses. First, the straight lines $O_1$—$C_1$ and $O_2$—$C_2$ should extend perpendicular to the reference faces 19 and 20. Furthermore, any angle $\alpha$ between on the one hand $O_1$—$C_1$ or $O_2$—$C_2$ and the cooperating fiber axis on the other hand should be as small as possible (the angle $\alpha$ being defined by the straight line $O_1$—$C_1$ and the axis 15). Third, the distance $\delta$ between the straight lines $O_1$—$C_1$ and $O_2$—$C_2$ should also be as small as possible.

This third requirement is especially important if two fiber ends are directly coupled, i.e. if the two lenses 17 and 18 are not used. If two fiber ends are to be directly coupled, it is thus important to minimize the distance between the end faces $O_1$ and $O_2$.

Only embodiments of coupling devices utilizing the spherical lenses 17 and 18 should be described hereinafter. However, it will be clear that the centering and alignment of ends of optical fibers according to the invention is not restricted to such coupling devices. Fiber ends, each having an envelope which is concentric with the optical core (see U.S. Pat. No. 4,289,374), can be centered and aligned very well by means of a coupling device according to the invention.

Figure 2:
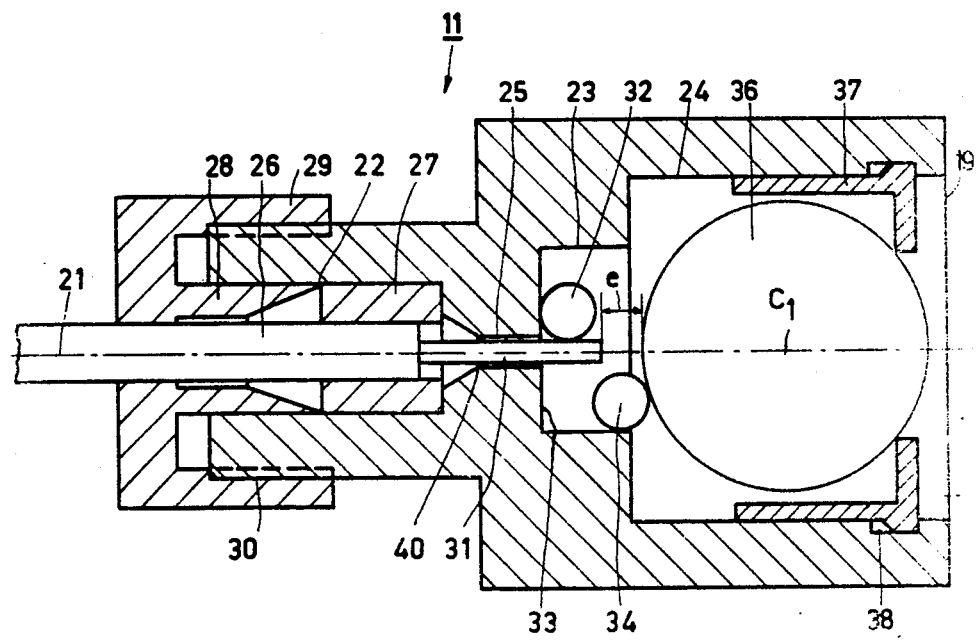
FIG. 2 is a sectional view through one of the symmetry planes of a first coupling device according to the invention.

The means used to satisfy these requirements are shown in FIG. 2 which shows the member 11 of an embodiment of a coupling device according to the invention in a sectional view through one of the symmetry planes. The symmetry axis is denoted by the reference numeral 21. Member 11 comprises a hollow metal body which is internally subdivided into two communicating recesses, a first recess in the form of a cylinder 22 and a second recess in the form of two circular cylinders 23 and 24. The first and second recesses communicate with each other via a bore in the form of a circular cylinder 25.

The cylinder 22 accommodates a jacketed fiber portion 26 and a part of the clamping means for clamping the fiber in this cylinder 22. The clamping means comprise, for example, a clamping bushing 27 which is compressed by means of a bevelled member 28. Bevelled member 28 rigidly connected to the clamping screw 29 which is screwed onto the external thread 30 on the metal body.

The bare end 31 of an optical fiber projects from the fiber envelope 26 into the recess 23 and 24 via the cylinder 25. The diameter of the cylinder 25 is approximately equal to the diameter of the bare fiber. In the cylinder 23 a first set of preferably three identical balls is arranged around the bare fiber; these balls are referred to as guide balls. FIG. 2 shows only one ball 32 of this set.

The guide balls 32 bear on the base 33 of the cylinder 23 and contact each other. Their centers form the apices of an equilateral triangle whose plane is parallel to the base 33. The diameter of the balls is such that the diameter of the circle which is inscribed in the space between the three balls and which is situated in the plane defined by the three centers of the balls is approximately equal to the fiber diameter. The balls should be situated so that the center of this space is situated on the symmetry axis 21.

Figure 3:
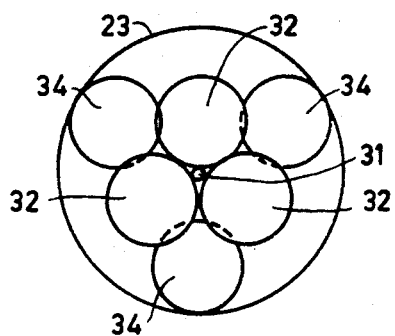
FIG. 3 is a front view, at the coupling side, of the sets of centering and clamping balls of the device shown in FIG. 2. This front view is taken perpendicular to the axis of rotation.

FIG. 3 is a view of the guide balls 32 and the fiber 31 in a direction parallel to the axis 21. The guide balls 32 are retained in their correct positions by means of a second set of mutually identical balls 34, which are referred to as clamping balls. Clamping balls 34 are clamped onto the guide balls 32 in the cylinder 23. FIG. 2 shows only one of these clamping balls 34. Each of the clamping balls 34 bears on two guide balls 32 and against the side of the cylinder 23. This method of positioning is visible in FIG. 3, all balls 32 and 34 of the first and the second set being shown therein, while the cylinder 23 is shown as a circle. The diameter of the balls of the second set may be equal to or larger than the diameter of the balls of the first set.

FIG. 2 shows an optical spherical lens 36 present in the cylinder 24. This spherical lens 36, having a center $C_1$, bears on the assembly formed by the three balls 34 of the second set under a slight pressure. Due to the geometry of the components used, the center $C_1$ is situated on the axis 21 which coincides with the axis of the end 31 of the fiber. The diameter of the optical lens 36 is so chosen, and the enveloped fiber portion 26 which is clamped in the cylinder 22 is so positioned, that the center $O_1$ of the front face of the fiber end 31 coincides with the focus of the spherical lens 36.

The assembly formed by the balls 32 and 34 of the first and the second set and the optical lens 36 are kept under pressure by means of a clamping means present in the cylinder 24, for example an elastic cupped spring washer 37. Washer 37 secured in a groove 38 in the wall of the cylinder 24.

In order to satisfy the requirement that the axis of two connector members are parallel to each other, the metal body is provided with a reference face 19 which extends perpendicular to the axis 21 which, due to the construction chosen, coincides with the axis of the optical fiber. As a result, the requirement that the angle $\alpha$ between the fiber axis and the axis 21 should be zero can be substantially satisfied. This value of $\alpha=0$ is approached to a higher degree as the length l of the fiber end, between the points of contact between the fiber and the balls 32 the one side and the entrance 40 of the cylinder 25 on the other side, is made larger. In practice the length l amounts to, for example, ten times the fiber diameter. Given embodiments of the coupling device according to the invention allow the length to be substantially increased.

A coupling between two fibers can be realized by positioning the reference surfaces 19 and 20 of the described members 11 and 12 against each other, with the outer edges of the metal bodies of each member 11 and 12 preferably being coincident and being retained in the correct position by a fixing means not shown. The fixing means may be for example, bayonet or screwed connections. The requirement that the axis of one fiber is the same as the axis of the other fiber is satisfied as much as possible due to the rotational symmetry of the metal bodies 11 and 12.

Figure 4:
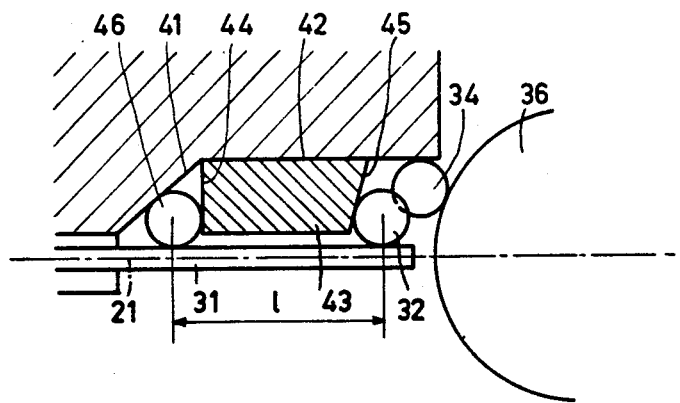
FIG. 4 is a partial sectional view through one of the symmetry planes of a second coupling device according to the invention.

A further embodiment of a coupling device according to the invention is shown in FIG. 4. FIG. 4 shows, in a sectional view through a symmetry plane, a part of a coupling device which provides the centering and the guiding of the fiber end 31. FIG. 4 also shows the axis 21 and the fiber end 31.

The recess 42 in FIG. 4 has a tapered bottom 41. The recess 42 also has a diameter which is much larger than the fiber diameter. The circularly cylindrical recess 42 accommodates a set of three balls 32 which is identical to the set of balls 32 in FIG. 3, and on which there is arranged a spacer bushing 43 in the form of a hollow cylinder whose outer diameter is slightly smaller than the inner diameter of the cylinder 42. The inner diameter of bushing 43 is slightly larger than the diameter of the fiber end 31.

The end faces 44 and 45 of the spacer bushing 43 extend transverse to the fiber end 31. The fiber end 31 is aligned by two sets of three balls, i.e. on the one hand by the set 32 (see FIG. 3) which bears on the face 45, and on the other hand by the set 46 which bears on the tapered bottom 41 and on the face 44. The length l of the guided fiber end 31 is thus dependent on the length of the spacer bushing 43.

As in the previously described embodiments, on the set of balls 32 there is arranged the set of balls 34 (see FIG. 3), and subsequently the optical lens 36. The assembly thus formed is kept under pressure as described with reference to FIG. 2.

Figure 5:
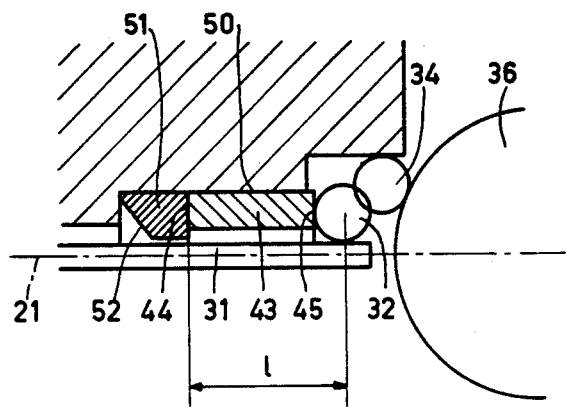
FIG. 5 is a partial sectional view through one of the symmetry planes of a third coupling device according to the invention.

A further embodiment of a coupling device according to the invention is illustrated in FIG. 5, which shows only a part of the coupling device in a sectional view. FIG. 5 shows the centering and guide location of the fiber end 31, and also the axis 21 and the fiber end 31.

Instead of the comparatively accurately proportioned bore 25 of FIG. 2 (the diameter adapted to the diameter of the fiber end 31), there is provided in FIG. 5 a further recess 50 which is concentric with the recess 23. A watch bearing 51 of synthetic ruby is arranged in recess 50. The outer diameter of watch bearing 51 equals that of the recess 50, and the inner diameter of bearing 51 is approximately equal to the fiber diameter.

A spacer bushing 43 (see FIG. 4) bears against the ruby bearing 51 by way of the face 44. The face 45 of the spacer bearing 43 bears against a set of balls 32 (identical to the set of balls of the FIGS. 2, 3 and 4) which itself is kept under pressure and which is positioned by the set of balls 34, the optical lens 36 and the clamping means secured in the recess 24. The fiber is aligned by the entrance opening 52 of the ruby bearing 51 and by the set of balls 32. The length l of the fiber end 31 depends on the length of the spacer bushing 43, as in the previous embodiment.

What is claimed is:

1. A device for detachably coupling a pair of optical fibers, said device comprising:
    two coupling members, each coupling member having an axis and first and second ends, each coupling member having a recess at the first end, said recess having a circularly cylindrical inner wall which is rotationally symmetric about the axis, each coupling member having a bore extending from the second end into the recess; and
    means for detachably connecting the coupling members to each other;
    characterized in that each coupling member further comprises:
    a first set of balls arranged in the recess around the axis, in operation the first set of balls surrounding and contacting an optical fiber to be coupled, the diameter of the recess being larger than the diameter of the smallest circle which can be circumscribed around the first set of balls when they are contacting the optical fiber;
    a second set of balls arranged in the recess around the first set of balls such that each ball of the second set bears on the inner wall of the recess and on two balls of the first set but not on the optical fiber to be coupled, thereby pressing the balls of the first set away from the inner wall of the recess and against the optical fiber; and
    a reference face, on the first end of the coupling member, directed transverse to the axis, the reference faces of two coupling members contacting each other when the members are coupled to each other.

2. A device as claimed in claim 1, characterized in that each coupling member further comprises:
    a spherical lens arranged on the axis in contact with the second set of balls; and
    means for clamping the lens into this position.

3. A device for detachably coupling a pair of optical fibers, said device comprising:
    two coupling members, each coupling member having an axis and first and second ends, each coupling member having a recess at the first end, said recess having a circularly cylindrical inner wall which is rotationally symmetric about the axis, each coupling member having a bore extending from the second end into the recess; and means for detachably connecting the coupling members to each other;

characterized in that the recess has a bottom wall at its bore end, and each coupling member further comprises:

means, at the bottom of the recess, for centering a fiber on the axis;

a spacer bushing bearing on the centering means;

a first set of balls bearing on the spacer bushing, said balls arranged in the recess around the axis, the diameter of the recess being larger than the diameter of the smallest circle which can be circumscribed around the first set of balls;

a second set of balls arranged in the recess around the first set of balls such that each ball of the second set bears on the wall of the recess and on two balls of the first set, thereby pressing the balls of the first set against each other; and a reference face, on the first end of the coupling member, directed transverse to the axis, the reference faces of two coupling members contacting each other when the members are coupled to each other.

4. A device as claimed in claim 3, characterized in that each coupling member further comprises:

a spherical lens arranged on the axis in contact with the second set of balls; and means for clamping the lens into this position.

5. A device as claimed in claim 4, characterized in that the centering means is a watch ruby having a funnel-shaped inlet opening facing the bore.

6. A device as claimed in claim 5, characterized in that the spacer bushing has at least one tapered end face.

7. A device as claimed in claim 6, characterized in that:

the diameter of the bore is substantially equal to the diameter of the largest circle which can be inscribed between the first set of balls; and the end of the bore which is remote from the recess opens into a funnel-shaped inlet opening.

8. A device as claimed in claim 4, characterized in that the centering means comprises a third set of balls.

9. A device as claimed in claim 8, characterized in that the bottom wall of the recess is tapered toward the bore.

10. A coupling member, for detachably coupling an optical fiber to another optical fibe, said coupling member comprising:

a housing having an axis, first and second ends, and a recess, said recess having a bottom wall and having a circularly cylindrical inner wall which is rotationally symmetric about the axis, said housing having a bore extending from the second end into the recess;

a first set of balls arranged in the recess around the axis, in operation the first set of balls surrounding and contacting an optical fiber to be coupled, the diameter of the recess being larger than the diameter of the smallest circle which can be circumscribed around the first set of balls when they are contacting the optical fiber;

a second set of balls arranged in the recess around the first set of balls such that each ball of the second set bears on the inner wall of the recess and on two balls of the first set but not on the optical fiber to be coupled, thereby pressing the balls of the first set away from the inner wall of the recess and against the optical fiber; and a reference face, on the first end of the housing directed transverse to the axis, the reference faces of two coupling members contacting each other when the members are coupled to each other.

* * * * *